US008657465B2

(12) United States Patent
Markell et al.

(10) Patent No.: US 8,657,465 B2
(45) Date of Patent: Feb. 25, 2014

(54) LIGHT EMITTING DIODE LAMP ASSEMBLY

(75) Inventors: Kevin Markell, Concord, NH (US); Aaron Plaza, Canterbury, NH (US); Charles F. McCurdy, Weare, NH (US); David Byers, Henniker, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 293 days.

(21) Appl. No.: 13/199,460

(22) Filed: Aug. 31, 2011

(65) Prior Publication Data

US 2013/0051005 A1 Feb. 28, 2013

(51) Int. Cl.
*F21V 33/00* (2006.01)
*F21V 29/00* (2006.01)
*B60Q 1/06* (2006.01)

(52) U.S. Cl.
USPC ............................ 362/234; 362/294; 362/373

(58) Field of Classification Search
USPC .................................. 362/234, 253, 294, 373
See application file for complete search history.

(56) References Cited

U.S. PATENT DOCUMENTS

| | | | | |
|---|---|---|---|---|
| 6,639,356 | B2 * | 10/2003 | Chin | 313/499 |
| 6,991,355 | B1 | 1/2006 | Coushaine et al. | |
| 7,110,656 | B2 | 9/2006 | Coushaine et al. | |
| 7,261,452 | B2 | 8/2007 | Coushaine et al. | |
| 7,357,534 | B2 | 4/2008 | Snyder | |
| 7,806,562 | B2 | 10/2010 | Behr et al. | |
| 7,922,364 | B2 | 4/2011 | Tessnow et al. | |
| 2005/0243559 | A1 | 11/2005 | Coushaine et al. | |
| 2006/0227558 | A1 * | 10/2006 | Osawa et al. | 362/351 |
| 2007/0070645 | A1 | 3/2007 | Coushaine et al. | |
| 2009/0034283 | A1 | 2/2009 | Albright et al. | |
| 2009/0175041 | A1 * | 7/2009 | Yuen et al. | 362/294 |
| 2010/0176741 | A1 * | 7/2010 | Sharrah et al. | 315/291 |
| 2010/0207505 | A1 | 8/2010 | Tessnow | |
| 2011/0111536 | A1 | 5/2011 | Brunner et al. | |

OTHER PUBLICATIONS

Machine translation of DE 20 2011 050 152 to Chuang.*
Product data sheet of Dow Coming® TC-3500-SP-S Printable Pad Thermal Interface Wet Dispensed, available at http://dowcoming.com, dated Feb. 8, 2011 (3 pages).
Product data sheet of Celanex® 3300-2/PBT/Glass Reinforced PBT pub'd by Ticona (Celanese) Jan. 1, 2007 (4 pp.).
Product data sheet of Ticona Celanex® 6407 30% Glass/Mineral Reinforced PBT pub'd by Ticona (Celanese) Jun. 28, 2011, copr. 2007 (2 pp.).
"what is roller forming" Overview accessed on website of Orbitform Group www.orbitform.com/modules ("FAQ") on Jul. 13, 2011 and pub'd. prior to present application filing date (3 pp.).
Product data sheet of DuPont Crastin CE2055 NC010 unreinforced PBT, copr. 2005 (2 pp.).

* cited by examiner

*Primary Examiner* — Anh Mai
*Assistant Examiner* — Zachary J Snyder
(74) *Attorney, Agent, or Firm* — Edward S. Podszus

(57) ABSTRACT

An LED lamp assembly. The assembly includes a heat sink having an upper outermost peripheral portion deformed continuously around an entire perimeter of the heat sink radially inward towards a peripheral rib in a housing cover, whereby the peripheral rib is compressed towards an inner rib of the heat sink thereby locking the housing cover to the heat sink.

9 Claims, 8 Drawing Sheets

FIG. 11

LIGHT EMITTING DIODE LAMP ASSEMBLY

FIELD

The present disclosure relates generally to electric lamp assemblies, and, more particularly, to a light emitting diode (LED) lamp assembly.

BACKGROUND

Lamp assemblies including light emitting diodes (LEDs) may be configured to exhibit increased energy efficiency and longer life compared to conventional incandescent lamps. LED lamps have therefore become desirable as a replacement for conventional incandescent lamps. One challenge associated with the design of LED lamps relates to management of the heat generated by the LEDs. To conduct the heat away from the LEDs, LED lamp assemblies typically incorporate a heat sink that is thermally coupled to the LEDS. The effectiveness of the thermal coupling of the LEDs to the heat sink affects the lumen efficiency and longevity of the LEDs in the assembly. Examples of LED lamp assemblies incorporating a heat sink configuration may be found, for example, U.S. Patent Pub. No. 2011/0111536 (Brunner et al.); U.S. Pat. No. 7,922,364 (Tessnow et al.); U.S. Patent Pub. No. 2010/0207505 (Tessnow); U.S. Pat. No. 7,806,562 (Behr et al.); U.S. Patent Pub. No. 2009/0034283 (Albright et al.); U.S. Pat. No. 7,357,534 (Snyder); U.S. Pat. No. 7,261,452 (Coushaine et al.); U.S. Patent Pub. No. 2007/0070645 (Coushaine et al.); U.S. Pat. No. 7,110,656 (Coushaine et al.); U.S. Pat. No. 6,991,355 (Coushaine et al.); and U.S. Patent Pub. No. 2005/0243559 (Coushaine et al.).

FIG. 1 is an exploded view of a known LED lamp assembly 100. The illustrated assembly includes a metallic heat sink 102, a connector 104, a thermal pad 106, a printed circuit board (PCB) 108 with LEDs 110 and associated electronics thereon, a housing cover 112 including an integrally molded optic portion 114, and a reflector seal 116. In general, the PCB 108 is provided between the housing cover 112 and the heat sink 102 with the LEDs 110 on the PCB 108 positioned for emitting light through the optic portion 114. Electrical energy for driving the LEDs 110 is coupled through the connector 104 to the PCB 108.

The metallic heat sink 102 is a die-cast part formed from an aluminum alloy. The heat sink includes a body portion 120 having an upper outwardly facing surface 122 and a lower outwardly facing surface 124. The lower outwardly facing 124 surface includes a plurality of pins 126 extending therefrom in a direction away from the lower outwardly facing surface 124 for assisting in dissipating heat conducted to the heat sink 102 from the PCB 108. An opening 128 extends from the upper outwardly facing surface 122 to the lower outwardly facing surface 124. The opening 128 is sized and dimensioned for receiving the connector 104.

The connector 104 includes a hollow body portion 130 and an end portion 132 at the end of the body portion 130. The end portion 132 extends outwardly relative to the body portion 130. A plurality of conductive compliant connector pins 134 extends through the end portion 132 and into a cavity defined by the hollow body portion 130 for electrical connection to a mating connector associated with a power source. The pins 134 extend outwardly from the end portion 132 for electrical connection with a mating connector on the PCB 108. The pins 134 are generally compliant to accommodate compression of the pins 134 into the PCB 108 while maintaining reliable electrical connections.

The connector 104 is received in the opening 128 in the heat sink 102 so that the body portion 130 extends outwardly away from the lower outwardly facing surface 124 of the heat sink body portion 120. The upper outwardly facing surface 122 of the body portion 120 defines a connector channel 136 for receiving an associated rib extending downwardly from a bottom surface 132 of the end portion of the connector 104. The connector 104 is coupled and sealed to the heat sink 102 by inserting a sealant 138 in the channel 136 and registering the rib on the bottom of the end portion 132 of the connector 104 with the channel 136. The sealant 138 may be a sealant that is lubricious prior to curing to facilitate positioning of the connector 104 relative to the heat sink 102, but cures to a relatively hardened state after the connector 104 is registered with the heat sink 102. One material useful as the sealant is the LOCTITE 5910 brand silicone sealant material, which is commercially available from Henkel AG & Co. KGaA of Düsseldorf, Germany.

The heat sink 102 also defines a continuous radial outermost peripheral portion 140 extending outwardly away from the upper outwardly facing surface 122 at the radially outermost periphery of the upper outwardly facing surface 122. A continuous or substantially continuous channel 142 is defined between the outermost peripheral portion 140 and an inner rib 144 extending outwardly away from the upper outwardly facing surface 122 at a position radially inward from the outermost peripheral portion 140. The space radially inward from the outermost peripheral portion 140 between the outermost peripheral portion 140 and upper outwardly facing surface 122 defines a circuit board receiving region 143 surrounded by the channel 142.

The PCB 108 is received within the circuit board receiving region 143. The thermal pad 106 is disposed on the bottom surface 146 of the PCB 108, either as a separate component, or affixed to the bottom surface 146 of the PCB. The thermal pad 106 is constructed from a thermally conductive material to facilitate transfer of heat from the bottom surface 146 of the PCB 108 to the upper outwardly facing surface 122 of the heat sink 102. In one configuration, the thermal pad 106 is provided by printing, e.g. screen printing, a thermally conductive material on the bottom surface 146 of the PCB 108 whereby the material is printed in a liquid state and then cures to non-liquid state. One material useful as a material for the thermal pad 106 is the TC-3500-SP-S brand printable thermal pad material, which is commercially available from Dow Corning Corporation of Midland, Mich., USA.

To facilitate positioning of the PCB 108 and thermal pad 106 in the circuit board receiving region 143, the heat sink defines a plurality of mechanical registration features 148 extending upwardly from the upper outwardly facing surface 122 thereof. The mechanical registration features 148 are sized and shaped to register with corresponding registration openings 150 defined in the PCB 108 and the thermal pad 106. The registration openings 150 in the PCB 108 and the thermal pad 106 are aligned with the mechanical registration features 148 and the PCB 108 is placed into the circuit board receiving region 143 with the mechanical registration features 148 extending into or through the registration openings 150. With the PCB 150 in this position, the bottom surface 152 of the thermal pad 106 is in direct physical contact with the upper outwardly facing surface 122 of the heat sink 102 and the peripheral edge surface 154 of the PCB 108 is in opposed facing relationship to the inner surface 156 of the inner rib 144 of the heat sink 102.

With reference also to FIG. 2, the housing cover 112 is molded from a plastic material. The housing cover 112 includes a longitudinally extending median region 158 having lower surface 160 facing the PCB 108 and an upper surface 162 facing away from the PCB 108, and defines a continuous peripheral rib 164 depending from the lower surface 160 at the radially outermost periphery of the median region 158. The peripheral rib 164 is sized and shaped to register with the channel 142 in the heat sink 102.

The integrally molded optic 114 of the housing cover 112 is positioned centrally in the median region 158. The optic 114 includes an upper portion 166 extending upwardly above the upper surface 162 of the median region 158 and a lower portion 168 extending downwardly away from the lower surface 160 of the median region 158 and toward the PCB 108. The reflector seal 116 is an annular rubber gasket element disposed around the upper portion 166 of the optic and against the upper surface 162 of the median region 158 for sealing the assembly 100 to a mounting position, e.g. in a vehicle head lamp.

The optic 114 defines a passage 170 extending from a top surface 172 of the optic 114 to a bottom surface 174 of the optic 114. A plurality of reflectors 176 is disposed in the passage 170. When assembled, the lower portion 168 of the optic is disposed at a predetermined nominal distance from the LEDs 110 with the optical axis A of the optic 114 transverse to the median region 158 and aligned with the LEDs 110. The lower portion 168 of the optic 114 includes respective openings 178 aligned with each of the LEDs 110 whereby light emitted by the LEDs 110 passes into the openings 178, through the lower portion 168 of the optic 114, and out of the passage 170 through the upper portion 166 of the optic 114 with at least some of the light being reflected out through the upper portion 166 by the reflectors 176.

A plurality of registration pads 180 are defined on the lower surface 160 of the median portion 158 adjacent the optic 114. The registration pads 180 extend downwardly toward the PCB 108. In an assembled condition, the registration pads 180 limit a spaced relationship between the optic 114 and the LEDs 110.

A plurality of mechanical registration projections 182 are defined on the lower surface 160 of the median portion 158 adjacent each side of the bottom portion 168 of the optic 114 and closer to the bottom portion 168 of the optic than to the peripheral rib 164 of the housing cover 112. Each of the mechanical registration projections 182 is configured as a hollow receptacle that extends downwardly toward the PCB 108 with an opening 184 that is sized and shaped to register with the mechanical registration features 148 of the heat sink 102. The mechanical registration features 148 on the heat sink 102 thus register with the registration openings 150 in the thermal pad 106 and the PCB 108 and the mechanical registration projections 182 on the housing cover 112 to provide a desired alignment between the housing cover 112, the PCB 108 and the heat sink 102.

The housing cover 112 illustrated in FIGS. 1 and 2 was injection molded in an edge-gated fashion, i.e. plastic was injected into a mold at the edge of the housing cover, at a location along a line (the Y-Y cross-sectional line in FIG. 4) perpendicular to the longitudinal axis of the reflectors 176. The housing cover 112 was molded from a polybutylene terephthalate (PBT) material such as the CRASTIN CE2055 NC010 brand material, which is commercially available from the E. I. DuPont de Nemours & Co., Inc., of Wilmington, Del., USA. The molded housing cover 112 was without warp. The term "warp" as used herein refers to a departure from a planar surface that is dished inward toward the PCB 108 and is measured according to the method described below in connection with FIG. 3 and FIG. 4.

Warp as described herein is determined by making a plurality of measurements along the upper surface 162 of the median region 158 in a cross-section of the housing cover 112. The measurements may be made in any cross-section extending across the upper surface 168 of the median region 158. For example, measurements may be made in the cross-section extending through the longitudinal axis of the reflectors 176, i.e. the X-X cross-section in FIG. 4, or in the cross-section that is 90 degrees to the longitudinal axis of the reflectors 176, i.e. the Y-Y cross-section in FIG. 4.

FIG. 3 diagrammatically illustrates a side view of the housing cover 112 of FIG. 2 with measurement lines L1 and L2 in the Y-Y cross-section and with warp in the housing cover 112 exaggerated as to scale of ease of explanation. Although measurements are described herein as being made in the Y-Y cross-section it is to be understood that measurements in other cross-sections are made in the same manner.

As shown, a measurement M1 is made at a first side 190 of the upper portion 166 of the optic 114 from a tangency T1 to the median region 158 where the upper surface 162 of the median region 158 intersects the upper portion 166 of the optic to the line L1, which is parallel to the tangency T1 and intersects the outermost peripheral edge 192 of the top surface 162 of the median region 158 on the first side 190 of the upper portion 166 of the optic 114. A second measurement M2 is made at a second side 194 of the upper portion 166 of the optic 114 from a tangency T2 to the median region 158 where the upper surface 162 of the median region 158 intersects the upper portion 166 of the optic 114 to the line L2, which is parallel to the tangency T2 and intersects the outermost peripheral edge 192 of the top surface 162 of the median region 158 on the second side 194 of the upper portion 166 of the optic 114. Warp is calculated for the cross-section in which measurements are made by taking an average of the measurements M1 and M2. The warp in housing cover 112 is the warp calculated in the cross-section that gives the maximum warp value. A housing cover 112 is described herein as having "zero" warp or "without" warp, when warp calculated by the method described above is less than about 0.1 mm.

The housing cover 112 is coupled and sealed to the heat sink 102 by inserting the sealant 138 in the channel 142 and registering the peripheral rib 164 of the housing cover 114 with the channel 142 in the heat sink 102. As discussed above, the sealant 138 may be lubricious prior to curing to facilitate mating of the housing cover 112 with the heat sink 102, but may cure to a relatively hardened state after the housing cover is mated with the heat sink 102. The housing cover 112 may be further secured to the heat sink 102 by fasteners, such as screws, a snap-fit of corresponding elements on the heat sink 102 and the housing cover 112 and/or by staking.

FIGS. 4 and 5 illustrate the lamp assembly 100 in an assembled condition. When assembled, the outermost peripheral portion 140 of the heat sink 102 forms a generally square corner with the top surface 162 of the median region 158 of the housing cover 112 without imparting compressive force on the peripheral rib 164 of the housing cover 112. In addition, warp in the housing cover 112 is generally dished inward toward the heat sink 102.

One difficulty associated with the LED lamp assembly 100 relates to achieving a desired tolerance between the bottom surface 174 of the optic 114 and the LEDs 110. In one embodiment, for example, the desired height between the bottom surface 174 of the optic and the top of the LEDs 110 is 0.8 mm. In the LED lamp assembly 100, however, in assembling the housing cover 112 to the heat sink 102 the housing cover 112 tends to push upward, e.g. about 0.5 mm, away from the desired height. The difficulty in achieving the desired optical tolerance in the LED lamp assembly 100 makes manufacture of the assembly 100 cumbersome and can affect optical performance if the desired height is not achieved.

Another known LED lamp assembly 600 is illustrated in FIG. 6. The illustrated assembly includes a metallic heat sink 602, an electrical connector 604, a housing cover 606 without warp, and an optic 608. In general, a PCB with LEDs and associated electronics thereon is provided between the housing cover 606 and the heat sink 602 with the LEDs on the PCB positioned for emitting light through the optic 608. Electrical energy for driving the LEDs is coupled through the connector 604 to the PCB.

As shown, the heat sink 602 includes a plurality of separate tab portions 610 around the periphery thereof. The tab portions 610 of the heat sink 602 are deformed downward against the top surface 612 of the housing cover 606, thereby compressing the housing cover 606 downward toward the heat sink 602 and the PCB disposed between the housing cover 606 and the heat sink 602. Each of the tab portions 610 imparts a separate associated compressive force on the housing cover 606 establishing a discontinuous and varying compressive force against the housing cover 606 around the periphery thereof.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

In general, an LED lamp assembly consistent with the present disclosure provides improved thermal coupling of LEDs to a heat sink through a continuous deformation of the outermost peripheral portion of the heat sink around entire perimeter of the heat sink and toward a peripheral rib of the housing cover. The peripheral rib of the housing cover is compressed continuously around the perimeter of the housing cover toward an inner rib of the heat sink, thereby locking the housing cover to the heat sink.

In some embodiments, the housing cover is intentionally provided with a warp of at least 0.5 mm. The warp is reduced by the compression of the peripheral rib of the housing cover toward the inner rib of the heat sink. This reduction of the warp in the housing cover results in a corresponding urging of optical registration pads toward the PCB and improved thermal coupling between the PCB and the heat sink. Improved thermal coupling between the PCB and heat sink results in improved performance and longevity of the assembly. Improved spacing tolerance between the LEDs and an optic in the housing cover is also achieved.

Figure 1:
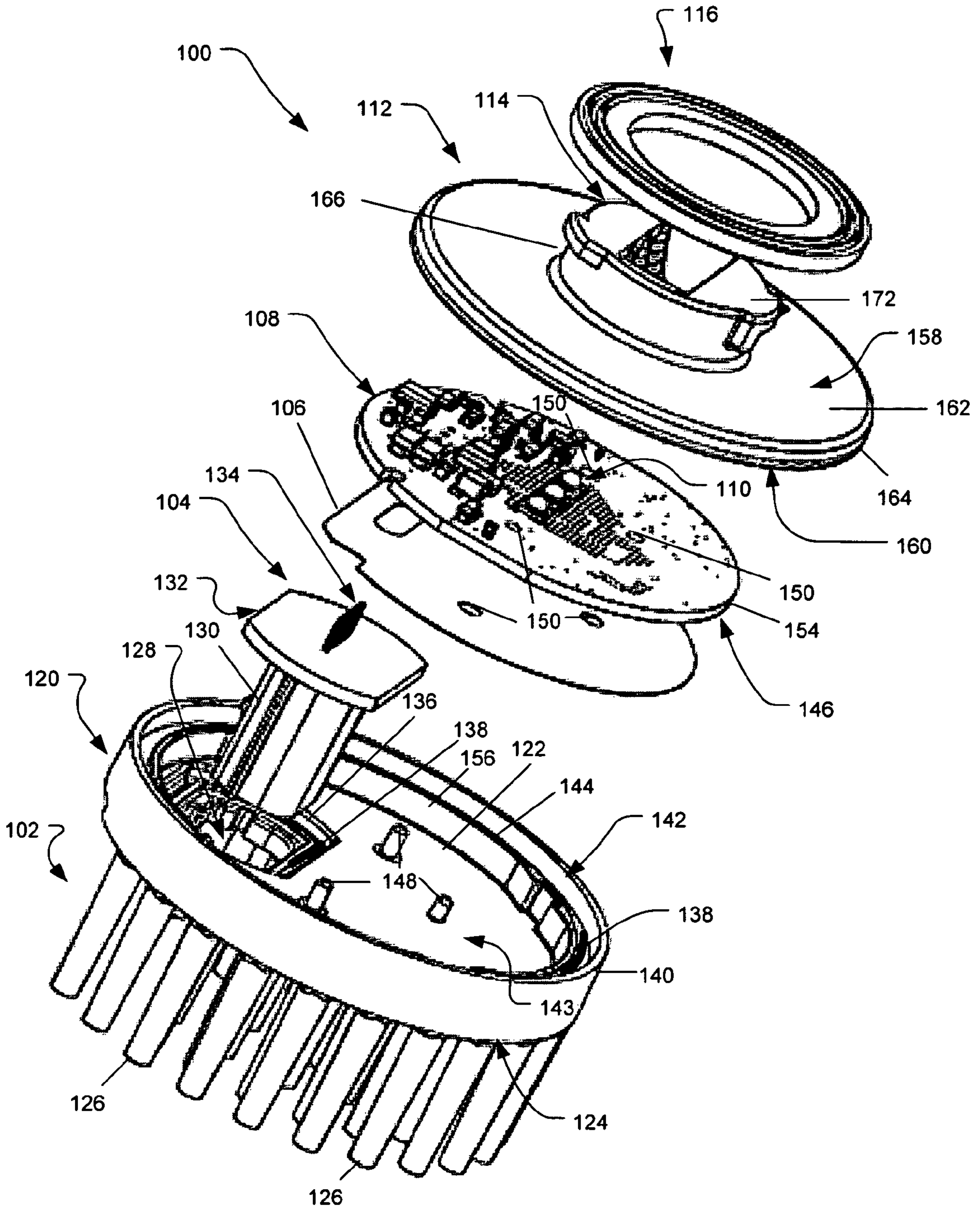
FIG. 1 Prior Art
FIG. 1 is an exploded view of a prior art LED lamp assembly.
Figure 2:
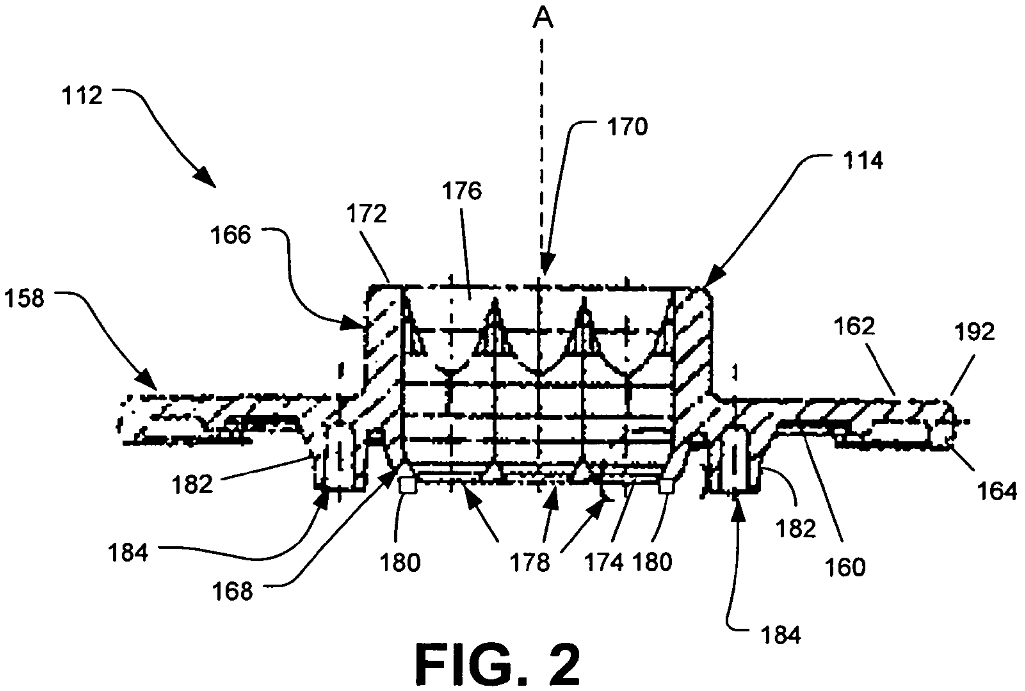
FIG. 2 Prior Art
FIG. 2 is a sectional view of the housing cover of the prior art lamp assembly of FIG. 1.
Figure 3:
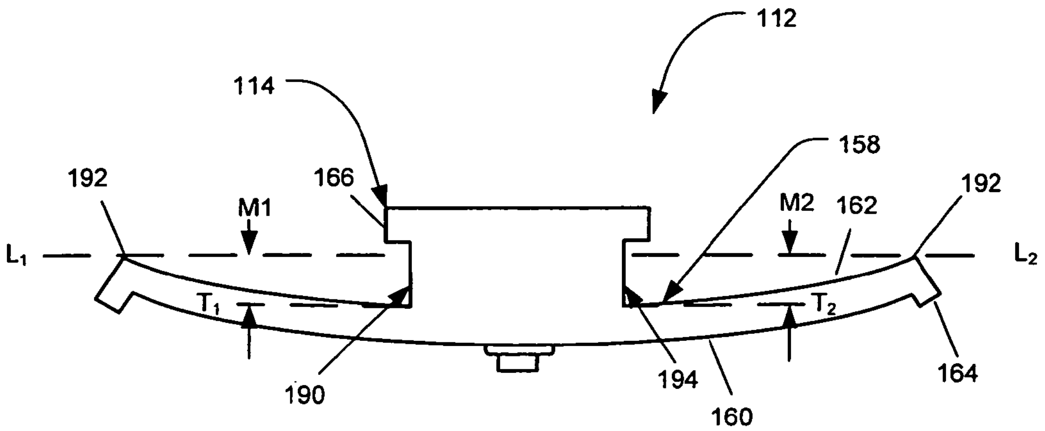
FIG. 3 Prior Art
FIG. 3 diagrammatically illustrates the housing cover of the prior art lamp assembly of FIG. 1 and a method of measuring warp consistent with the present disclosure.
Figure 7:
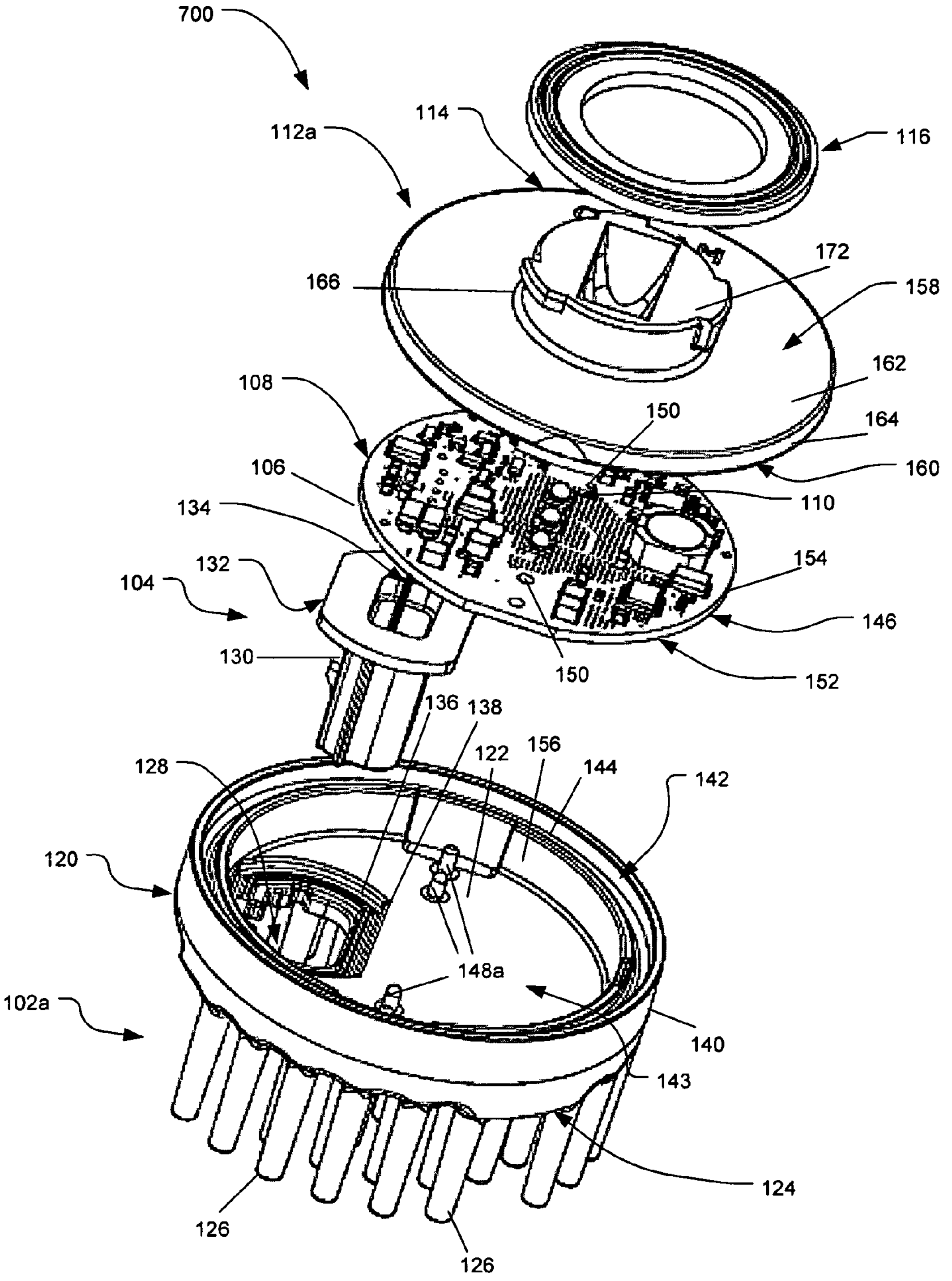
FIG. 7 is an exploded view of an LED lamp assembly consistent with the present disclosure.

FIG. 7 is an exploded view of an LED lamp assembly 700 consistent with the present disclosure. The illustrated exemplary embodiment includes many of the features and components of the assembly shown in FIG. 1. Components and features in common between the assemblies of FIG. 1 and FIG. 7 bear like reference numerals. Reference should be made to the description above regarding such like components and features. Such description will not be repeated in connection with FIG. 7 for simplicity and ease of explanation.

Figure 8:
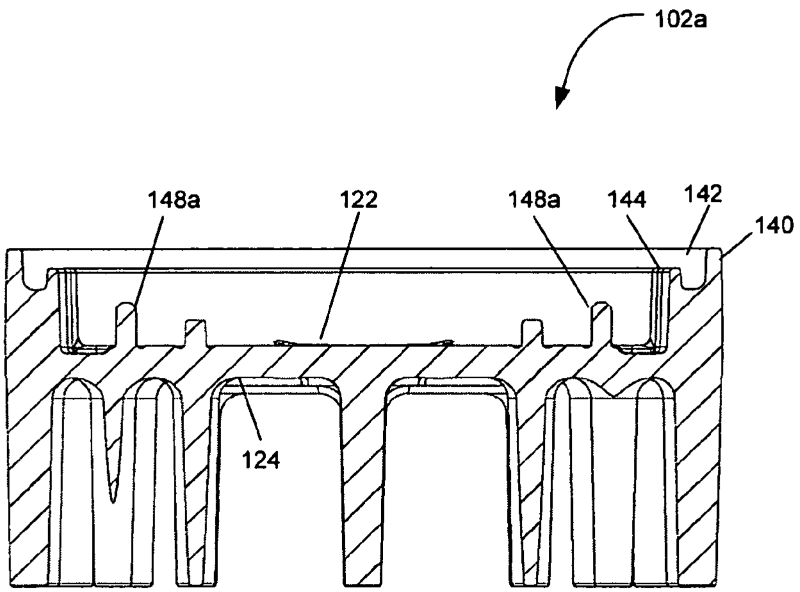
FIG. 8 is a sectional view of the heat sink of the LED lamp assembly of FIG. 7.
Figure 9:
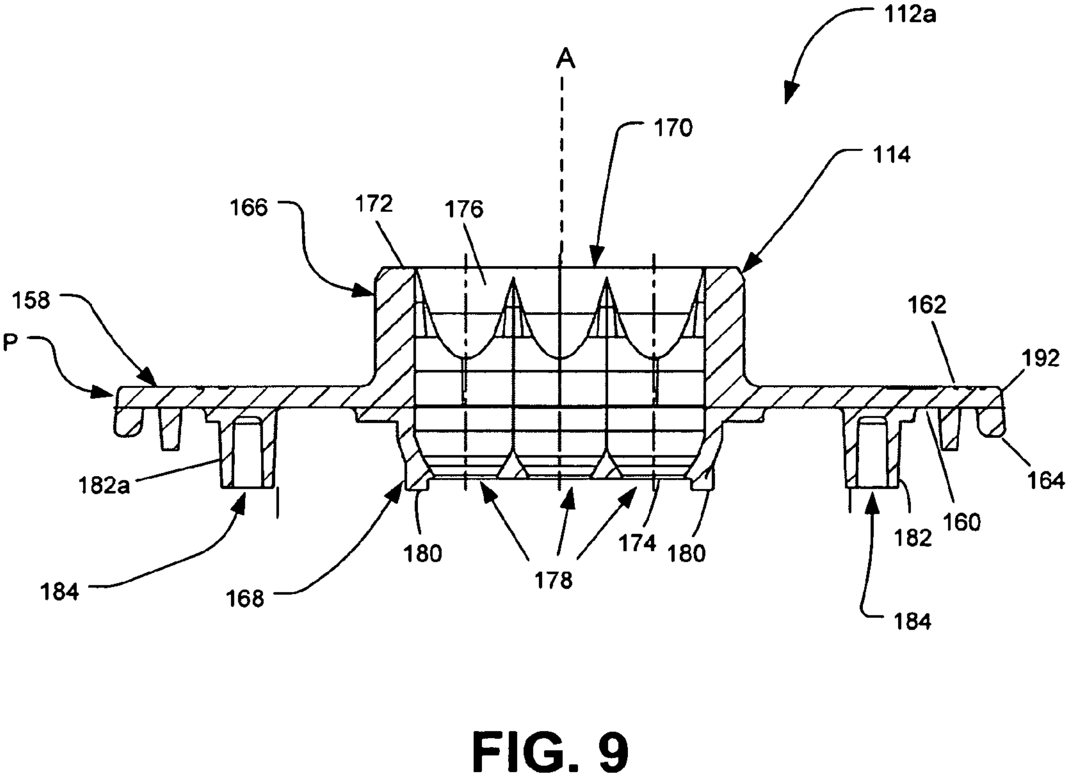
FIG. 9 is a sectional view of the housing cover of the LED lamp assembly of FIG. 7.

In general, the embodiment 700 illustrated in FIG. 7 includes a heat sink 102*a* and a housing cover 112*a*. As shown in FIG. 8, the heat sink 102*a* includes mechanical registration projections 148*a* positioned closer to the inner rib 144 of the heat sink 102*a* than in the embodiment 100 shown in FIG. 1. Correspondingly and as shown in FIG. 9, the housing cover 112*a* includes a plurality of mechanical registration features 182*a* positioned closer to the peripheral rib 164 of the housing cover 112 than in the embodiment 100 shown in FIG. 1.

Figure 4:
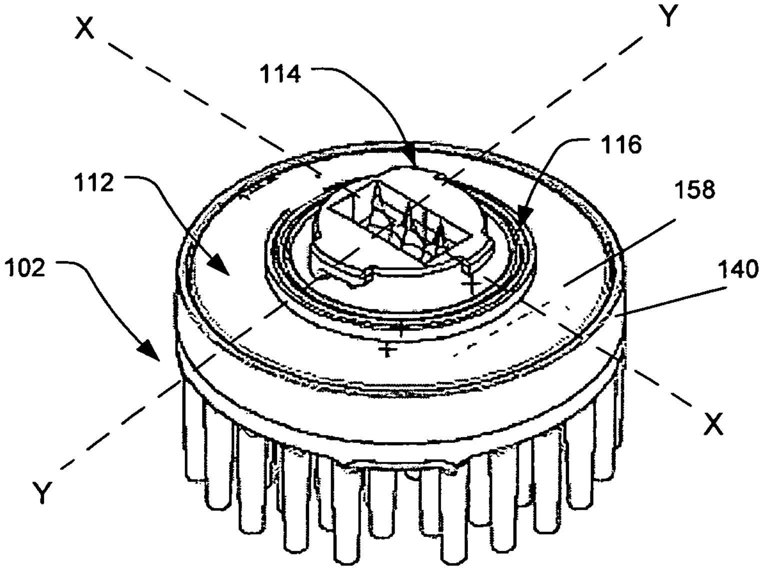
FIG. 4 Prior Art
FIG. 4 is an perspective view of the prior art lamp assembly of FIG. 1.
Figure 5:
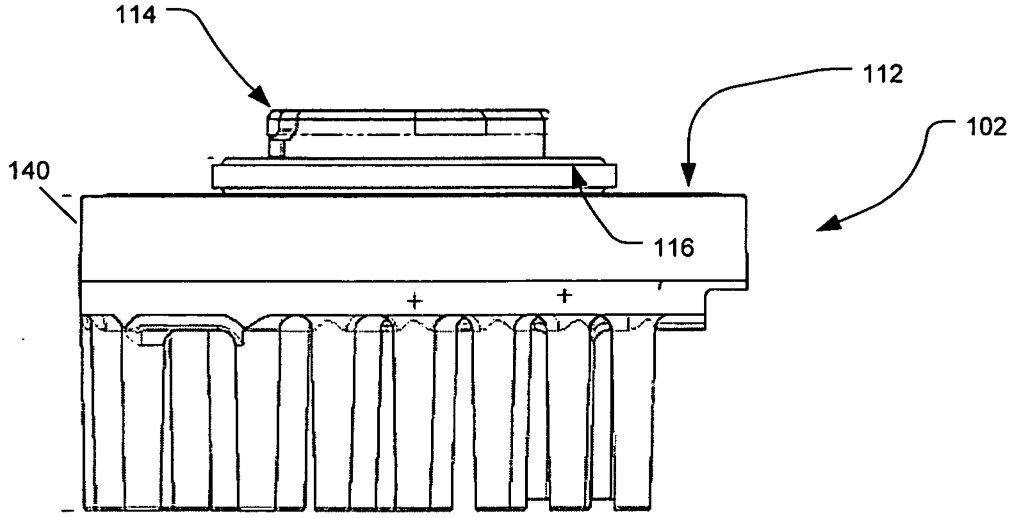
FIG. 5 Prior Art
FIG. 5 is a side view of the prior art lamp assembly of FIG. 1.
Figure 6:
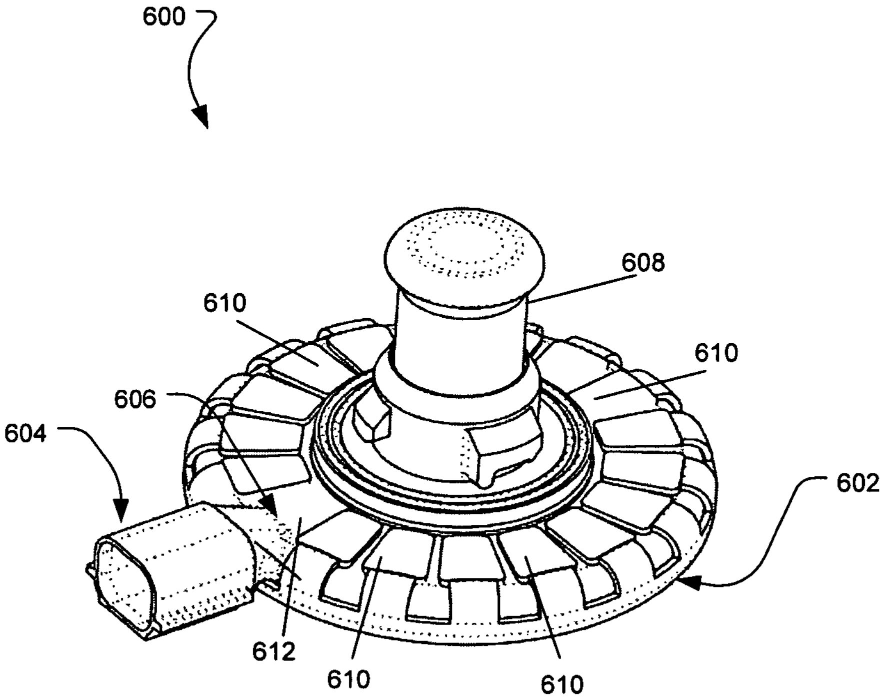
FIG. 6 Prior Art
FIG. 6 is a perspective view of another prior art LED lamp assembly.

In addition, the housing cover 112*a* may be intentionally formed with a warp of at least 0.5 mm in an unconstrained and unassembled condition. In some embodiments, the warp in the housing cover 112*a* may be between 0.5 mm and 1.3 mm in an unconstrained and unassembled condition. Warp may be intentionally provided in the housing cover 112*a* using an edge-gated mold with an appropriate selection of material and cure time in the mold. In one embodiment, for example, warp at the lower end of the range from 0.5 mm and 1.3 mm may be achieved using a 30% glass/mineral reinforced polyester material such as the CELANEX 6407 brand material commercially available from the Ticona Division of the Celanese Corporation of Dallas, Tex., USA. In another embodiment, warp at the higher end of the range from 0.5 mm and 1.3 mm may be achieved using a 30% glass-filled PBT material such as the CELANEX 3300 brand material commercially available from the Ticona Division of the Celanese Corporation of Dallas, Tex., USA. With these materials, increasing the cure time in the mold results in lower warp in the housing cover 112*a*. The location of the edge-gating of the housing cover 112*a* determines the direction of the warp in the housing cover 112*a*. In the illustrated embodiment, the housing cover 112*a* is edge-gated along the X-X cross section (FIG. 4) extending through the longitudinal axis of the reflectors 176, e.g. at the position P shown in FIG. 9.

Figure 10:
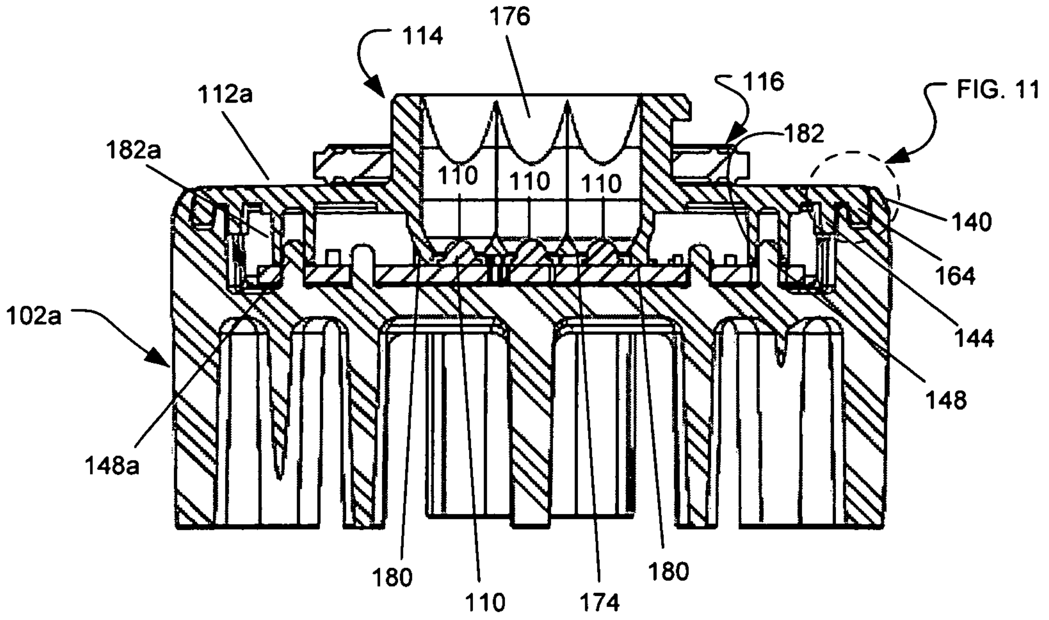
FIG. 10 is a sectional view of the LED lamp assembly of FIG. 7 showing the orientation of the housing cover to the heat sink after deformation of the outermost peripheral portion of the heat sink toward the peripheral rib of the housing.
Figure 11:
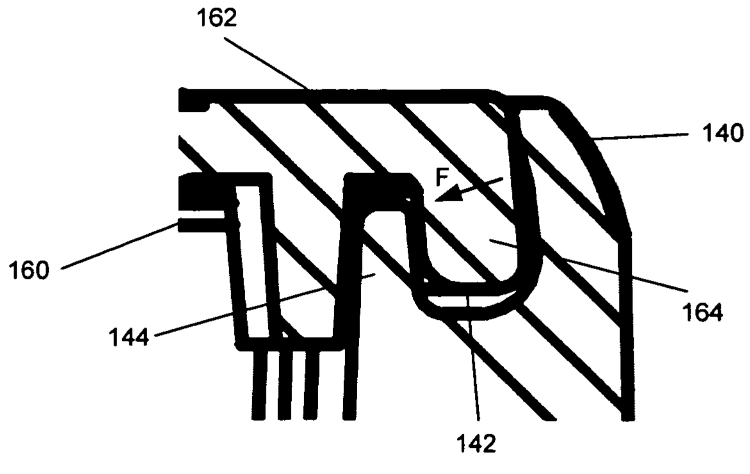
FIG. 11 is a detailed view of a portion of the LED lamp assembly illustrated in FIG. 10.
Figure 12:
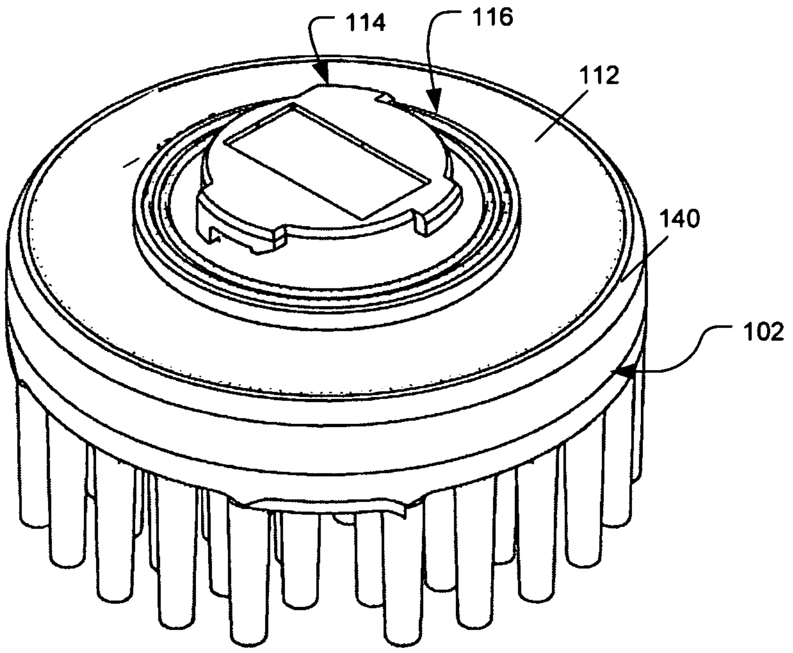
FIG. 12 is a perspective view of the LED lamp assembly of FIG. 7.

FIG. 10 is a cross-sectional view of the lamp assembly 700 in an assembled condition, and FIG. 11 is a detailed view of the portion of FIG. 10 indicated dashed lines. FIG. 12 is a perspective view of the LED lamp assembly 700. As shown, the outermost peripheral portion 140 of the heat sink 102*a* may be continuously deformed around entire perimeter of the heat sink 102*a* and toward the peripheral rib 164 of the housing cover 112*a*. Deformation of the outermost peripheral portion 140 of the heat sink 102*a* imparts a force component F, shown in FIG. 11, against the peripheral rib 164 that compresses the peripheral rib 164 against the inner rib 144 of the heat sink 102*a*. The peripheral rib 164 of the housing cover 112*a* is thus compressed continuously around the perimeter of the housing cover 112*a* against the inner rib 144 of the heat sink 102*a*, thereby locking the housing cover 112*a* to the heat sink 102*a*.

Continuous deformation of the outermost peripheral portion 140 of the heat sink 102*a* to lock the housing cover 112*a* to the heat sink 102*a* may be performed with a housing cover 112*a* having any amount of warp, including zero warp. However, in an embodiment wherein warp of at least 0.5 mm is intentionally imparted to the housing cover 112*a*, e.g. by using an edge-gated mold with the edge-gate along the longitudinal axis of the reflectors 176, the warp is reduced by the compression of the peripheral rib 164 of the housing cover 112*a* toward the inner rib 144 of the heat sink 102*a*. In the illustrated embodiment, positioning the mechanical registration projections 182*a* of the housing cover 112*a* closer to the peripheral rib 164 of the housing cover 112*a* than to the lower portion 168 of the optic 114 allows for deflection in the housing cover 112*a* for reducing the warp in the cover 112*a* when the peripheral rib 164 of the cover 112*a* is compressed inward against the inner rib 144.

This reduction of the warp in the housing cover 112*a* results in a corresponding urging of optical registration pads 180 toward the PCB 108 and improved thermal coupling between the PCB 108 and the heat sink 102*a*. Improved thermal coupling between the PCB 108 and heat sink 102*a* results in improved performance and longevity of the assembly 700. In addition, urging of the optical registration pads 180 toward the PCB 108 establishes a desired height between the bottom surface 174 of the optic 114 and the LEDs 110 within a close tolerance compared to the LED assembly 100. In one embodiment, for example, the desired height between the bottom surface 174 of the optic and the top of the LEDs 110 is 0.8 mm. Continuous deformation of the outermost peripheral portion 140 of the heat sink 102*a* to lock the housing cover 112*a* to the heat sink 102*a* placed the bottom surface 174 of the optic within about +/−0.05 mm from the desired height. The close tolerance to the desired height between the bottom surface 174 of the optic 114 and the LEDs 110 allows for facile assembly and high optical performance.

Continuous deformation of the outermost peripheral portion 140 of the heat sink 102*a* toward the peripheral rib 164 of the housing cover 112*a* may be accomplished by, for example, known swaging or roll-forming processes. In one embodiment, for example, the outermost peripheral potion 140 of the heat sink 102*a* may be roll-formed using a roller head including three rollers disposed in the roller head in a circular pattern and separated by 120 degrees. The rollers may include a contoured diameter configured for deforming the outermost peripheral portion 140 of the heat sink 102*a* against the peripheral rib 164 of the housing cover 112*a* in a predetermined pattern. A power head carrying the roller head may be advanced toward outermost peripheral portion 140 of the heat sink 102*a* with the roller head spinning. As the roller head advances, the rollers engage the outermost peripheral portion 140 of the heat sink 102*a* to deform the outermost peripheral portion 140 of the heat sink 102*a* toward the peripheral rib 164 of the housing cover 112*a*. In one embodiment wherein the heat sink 102*a* is die-cast from an aluminum A380 alloy, for example, a roller head carrying three rollers may be advanced at a rate of about 0.5 ft/second with the roller head rotating at about 380 revolutions per minute (rpm).

According to the present disclosure, therefore, there is provided an improved LED lamp assembly of the type having a metallic heat sink defining a circuit board receiving region, the heat sink further defining on an upper outwardly facing surface thereof a substantially continuous channel surrounding the circuit board receiving region, the channel defined between an inner rib and a radially outermost peripheral portion of the heat sink; a circuit board positioned in the circuit board receiving region and having a plurality of light emitting diodes (LEDs) operatively fixed thereto; and a housing cover formed of a plastics material, the housing cover including a longitudinally extending median region having a lower surface facing the circuit board and an upper surface facing away from the circuit board, and defining a depending peripheral rib formed on the lower surface, the housing cover further including an integrally molded optic including a plurality of reflectors disposed on the housing cover, an optical axis of the optic being transverse the median region, wherein the rib is formed at an outermost peripheral region of the housing cover and sized and shaped to register with the channel formed in the heat sink, wherein the optic has a lower optic portion extending downwardly from the lower surface toward the circuit board and an upper optic portion extending upwardly above the median region, and the housing cover further including on the lower surface, adjacent the lower optic portion, a plurality of registration pads extending toward the circuit board to thereby limit in an assembled condition a spaced relationship between the optic and the plurality of LEDs. The improvement includes the feature that the upper outermost peripheral portion of the heat sink that bounds the channel is deformed continuously around an entire perimeter of the heat sink radially inward towards the peripheral rib of the housing cover whereby the peripheral rib is compressed towards the inner rib thereby locking the housing cover to the heat sink.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The following is a list of reference numeral used in the specification:

100 LED lamp assembly;
102 metallic heat sink;
102*a* metallic heat sink;
104 connector;
106 thermal pad;
108 printed circuit board (PCB);
110 LEDs;
112 housing cover;
112*a* housing cover;
114 integrally molded optic portion;
116 reflector seal;
120 body portion;
122 upper outwardly facing surface;
124 lower outwardly facing surface;
126 plurality of pins;
128 opening;
130 hollow body portion;
132 end portion;
134 connector pins;
136 connector channel;
138 sealant;
140 continuous radial outermost peripheral portion;
142 continuous or substantially continuous channel;
143 circuit board receiving region;
144 inner rib;
146 bottom surface;
148 mechanical registration features;
148*a* mechanical registration features;
150 registration openings;
152 bottom surface;
154 peripheral edge surface;
156 inner surface;
158 longitudinally extending median region;
160 lower surface;
162 upper surface;
164 continuous peripheral rib;
166 upper portion;
168 lower portion;
170 passage;
172 top surface;
174 bottom surface;
176 plurality of reflectors;
178 respective openings;
180 registration pads;
182 mechanical registration projections;
182*a* mechanical registration projections;
184 openings;
190 first side;
192 outermost peripheral edge;
194 second side;
600 LED lamp assembly;
602 metallic heat sink;
604 electrical connector;
606 housing cover;
608 optic;
610 separate tab portions; and
700 cross-sectional view of lamp assembly.

What is claimed is:

1. An improved LED lamp assembly of the type having a metallic heat sink (102) defining a circuit board receiving region (143), said heat sink (102) further defining on an upper outwardly facing surface (122) thereof a substantially continuous channel (142) surrounding said circuit board receiving region (143), said channel (142) defined between an inner rib (144) and a radially outermost peripheral portion (140) of said heat sink (102);

a circuit board (108) positioned in said circuit board receiving region (143) and having a plurality of light emitting diodes (LEDs) (110) operatively fixed thereto; and a housing cover (112) formed of a plastics material, said housing cover (112) comprising a longitudinally extending median region (158) having a lower surface (160) facing said circuit board (108) and an upper surface (162) facing away from said circuit board (108), and defining a depending peripheral rib (164) formed on said lower surface (160), said housing (112) cover further comprising an integrally molded optic (114) comprising a plurality of reflectors (176) disposed on said housing cover (114), an optical axis (A) of said optic (114) being transverse said median region (158), wherein said peripheral rib (164) is formed at an outermost peripheral region of said housing cover (112) and sized and shaped to register with said channel (142) formed in said heat sink (102), wherein said optic (114) has a lower optic portion (168) extending downwardly from said lower surface (160) toward said circuit board (108) and an upper optic portion (166) extending upwardly above said median region (158), and said housing cover (112) further comprising on said lower surface (160), adjacent said lower optic portion (168), a plurality of registration pads (180) extending toward said circuit board (108) to thereby limit in an assembled condition a spaced relationship between said optic (114) and said plurality of LEDs (110), wherein the improvement comprises:

the upper outermost peripheral portion (140) of the heat sink (102*a*) that bounds said channel (142) is deformed continuously around an entire perimeter of the heat sink (102*a*) radially inward towards the peripheral rib (164) of the housing cover (112*a*) whereby said peripheral rib (164) is compressed towards said inner rib (144) thereby locking said housing cover (112*a*) to said heat sink (102*a*).

2. The LED assembly of claim 1, wherein said housing cover (112*a*) has in an unconstrained, unassembled condition a warp, said warp being measured as an average of a first measurement (M1) in a cross-section of said housing cover (112*a*) and a second measurement (M2) in said cross-section of said housing cover (112*a*), said first measurement (M1) being taken on a first side (190) of said upper optic portion (166) between a first tangency (T1) to the median region (158) where the upper surface (162) of the median region (158) intersects said first side (190) of said upper optic portion (166) and a first line (L1) that is parallel to the first tangency (T1) and intersects the outermost peripheral edge (192) of said upper surface (162) of said median region (158) on said first side (190) of the upper optic portion (166), said second measurement (M2) being taken on a second side (194) of said upper optic portion (166) between a second tangency (T2) to the median region (158) where the upper surface (162) of the median region (158) intersects said second side (194) of said upper optic portion (166) and a second line (L2) that is parallel to the second tangency (T2) and intersects the outermost peripheral edge (192) of said upper surface (162) of the median region (158) on said second side (194) of the upper optic portion (166), said warp being at least 0.5 mm, and wherein said warp is reduced by said compression of said peripheral rib (164) towards said inner rib (144) whereby the registration pads (180) are urged towards said circuit board (108).

3. The LED assembly of claim 2, wherein said warp is less than 1.3 mm.

4. The LED assembly of claim 2, wherein said housing cover (112*a*) is a plastics molding that is edge-gated at said outermost peripheral region thereby promoting said warp during molding thereof.

5. The LED assembly of claim 4, wherein said optic (114) is located in a central portion of said housing (112*a*).

6. The LED lamp assembly of claim 1, wherein said heat sink outermost peripheral portion (140) is roll formed inward.

7. The LED assembly of claim 1, wherein said optic (114) is located in a central portion of said housing (112*a*).

8. The LED lamp assembly of claim 1, wherein said heat sink (102*a*) is a die-casting.

9. The LED lamp assembly of claim 8, wherein said heat sink outermost peripheral portion (140) is roll formed inward.

* * * * *